United States Patent
Axford et al.

(10) Patent No.: US 8,572,329 B2
(45) Date of Patent: Oct. 29, 2013

(54) MULTI-REGION DEFAULT MEMORY MAP

(75) Inventors: Simon Axford, Burwell (GB); Simon John Craske, Cambridge (GB); Paul Kimelman, Alamo, CA (US)

(73) Assignee: ARM Limited, Cambridge (GB)

( * ) Notice: Subject to any disclaimer, the term of this patent is extended or adjusted under 35 U.S.C. 154(b) by 2150 days.

(21) Appl. No.: 11/242,131

(22) Filed: Oct. 4, 2005

(65) Prior Publication Data
US 2007/0079093 A1    Apr. 5, 2007

(51) Int. Cl.
*G06F 12/00* (2006.01)
(52) U.S. Cl.
USPC ............................. 711/150; 711/151; 711/163
(58) Field of Classification Search
USPC .......................................... 711/150, 163, 151
See application file for complete search history.

(56) References Cited

U.S. PATENT DOCUMENTS

| | | | | | |
|---|---|---|---|---|---|
| 4,665,506 | A | * | 5/1987 | Cline et al. ............... | 365/189.01 |
| 5,265,227 | A | * | 11/1993 | Kohn et al. ................... | 711/207 |
| 5,649,159 | A | * | 7/1997 | Le et al. ....................... | 711/163 |
| 6,021,476 | A | * | 2/2000 | Segars ......................... | 711/163 |

OTHER PUBLICATIONS

Clements, Alan. "The Principles of Computer Hardware" Published 1993, PWS-KENT Publishing Company/Wadsworth Inc. Second Edition, 368.*

* cited by examiner

*Primary Examiner* — Kenneth Lo
(74) *Attorney, Agent, or Firm* — Nixon & Vanderhye P.C.

(57) ABSTRACT

A data processing system is provided with a programmable memory protection unit 10 defining a plurality of programmable memory regions 2, 4, 6, 8 each with associated programmable memory attributes. A default memory protection unit 22 is provided and defines a plurality of default memory regions a, b, c, d, e each with associated default memory attributes. If a miss occurs in the programmable memory protection unit 10, and the memory access is a privileged level memory access, then the default memory protection unit 22 will return default memory attributes for that memory request.

16 Claims, 3 Drawing Sheets

MULTI-REGION DEFAULT MEMORY MAP

BACKGROUND OF THE INVENTION

1. Field of the Invention

This invention relates to the field of data processing systems. More particularly, this invention relates to memory protection mechanisms within data processing systems using which it is determined from the target address of a memory access request what attributes are associated with that target address. As an example, in the case of a memory protection unit, depending upon the attributes associated with a particular target address, a memory access may be permitted or not permitted.

2. Description of the Prior Art

It is known to provide memory protection units which are programmable such that the total memory space is divided into programmable memory regions with programmable attributes associated with each of those memory regions. As an example, the attributes may indicate properties such as read only, cacheable, non-cacheable, not executable, etc. Circuit resources are consumed in the elements needed to define the programmable memory regions and to store the programmable attributes associated with those programmable memory regions. Whilst fine-grained control might be desirable, this requires significant circuit resources to achieve and this brings with it a disadvantageous increase in gate count, power consumption, cost etc.

It is an object of at least preferred embodiments of the invention to seek to provide suitably fine-grained control of memory accesses whilst consuming relatively low levels of circuit resource in a manner which is well suited to the most common type of use for such memory protection units.

SUMMARY OF THE INVENTION

Viewed from one aspect the present invention provides apparatus for processing data, said apparatus comprising:

a source of memory access requests to respective memory addresses within a memory address space;

a programmable memory protection unit operable to store programmable data defining a plurality of programmable memory regions within said memory address space having associated programmable memory attributes, said programmable memory protection unit being operable to receive a memory request to a target memory address from said source and, if said target address lies within one or more of said plurality programmable memory regions, then to return an associated programmable memory attribute for said target address; and a default memory protection unit operable to define a plurality of default memory regions within said memory address space having associated default memory attributes, said default memory protection unit being operable to receive said memory request to said target memory address from said source and, if said target address does not lie within one or more of said plurality programmable memory regions, then to return an associated default memory attribute for said target address.

The invention provides a default memory protection unit in addition to a programmable memory protection unit. This default memory protection unit defines a plurality of default memory regions each with associated default memory attributes. Since this default memory protection unit is non-programmable, it can be more efficiently implemented in terms of the amount of circuit resource it consumes. Nevertheless, it is able to provide a relatively fine-grain level of control as desired. When a memory access request is generated, should the target address hit within the programmable memory protection unit, then the programmable memory attributes from the programmable memory protection unit will be returned and used. If the target address misses in the programmable memory protection, then the default memory protection unit may be used to provide the default memory attributes associated with that target address. This technique recognises that it is predominately user code which utilises the programmable nature of a standard programmable memory protection unit and a considerable amount of the other code and operations can be provided with their memory protection function using a fixed default memory protection unit consuming comparatively little circuit resources. Thus, the programmable memory protection unit can itself be made smaller and more efficient since it will generally only have to cope with user level requests.

Whilst it is possible that the default memory protection unit could be used to service all memory requests which miss in the programmable memory protection unit, in preferred embodiments the default memory protection unit will only serve privileged level memory requests with memory requests from other levels resulting in a memory protection violation signal. Dedicating the default memory protection unit to privileged level memory requests means that areas of memory may be more readily protected from user level requests and be available for privileged level requests as necessary.

In preferred embodiments, the programmable memory protection unit and the default memory protection unit operate in parallel to receive the memory access request and determine the associated memory attributes. This advantageously shortens lookup/validation paths in the circuit.

Whilst it is possible for discrete default memory regions to be provided within the memory map managed by the default memory protection unit, in preferred embodiments the default memory regions contiguously span the memory space such that there are no gaps for which default memory attributes are not defined. In this way, desirably predictable and deterministic behaviour may be achieved.

The fine-grained nature of control provided by the programmable memory protection unit may be enhanced by providing that the programmable memory regions can overlap. With overlapping regions, a hit in multiple regions for a target address can occur and in this case a hierarchy associated with the memory regions is invoked and the memory attributes associated with the programmable memory region highest in that hierarchy are returned. As an example, a large low priority memory region may be defined and within this a smaller higher priority memory region can be overlaid. When a hit occurs within that smaller memory region, then the higher priority attributes associated with that smaller memory region are returned rather than the memory attributes associated with the larger underlying memory region.

Both the programmable memory protection unit and the default memory protection unit may be advantageously selectively enabled and disabled. Disabling of the default memory protection unit may be desirable for a particular use when the default memory regions and default memory attributes are not suitable for that particular application. Disabling of the programmable memory protection unit may be desirable, for example, when dealing with corruption of the data within the programmable memory protection unit so that erroneous operation of the programmable memory protection unit does not interfere with corrective action and corrective operations being performed.

Viewed from another aspect the present invention provides a method of processing data, said method comprising the steps of:

generating memory access requests to respective memory addresses within a memory address space;

storing programmable data within a programmable memory protection unit defining a plurality of programmable memory regions within said memory address space having associated programmable memory attributes;

receiving a memory request to a target memory address in said programmable memory protection unit and, if said target address lies within one or more of said plurality programmable memory regions, then returning an associated programmable memory attribute for said target address;

storing default data within a default memory protection unit defining a plurality of default memory regions within said memory address space having associated default memory attributes; and receiving a memory request to a target memory address in said default memory protection unit and, if said target address does not lie within one or more of said plurality programmable memory regions, then returning an associated default memory attribute for said target address.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
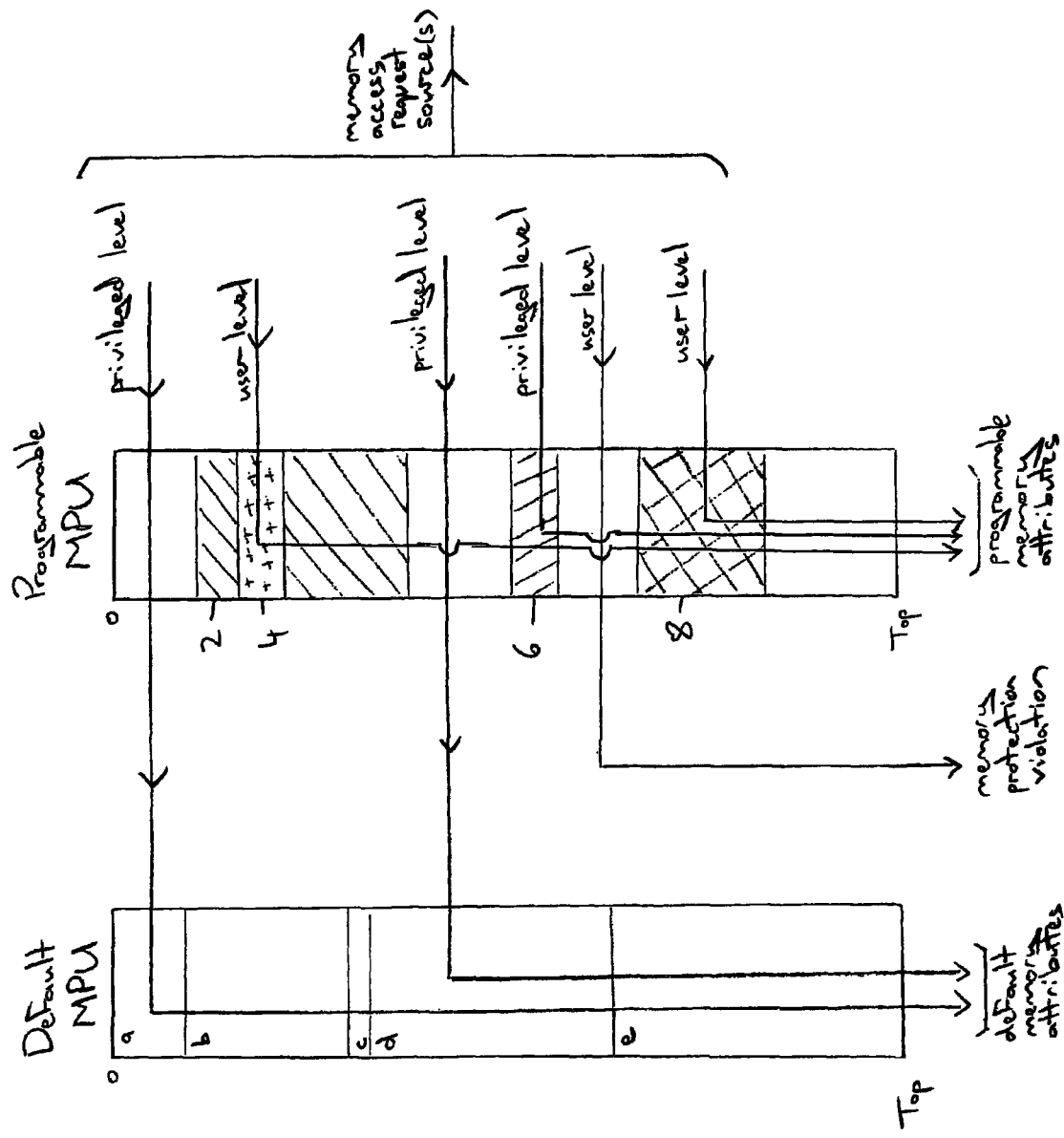
FIG. 1 schematically illustrates memory protection operations performed by a programmable memory protection unit and a default memory protection unit.

FIG. 1 schematically illustrates memory access requests received from memory access request source(s). These sources may include a CPU, a peripheral device, or some other device within a data processing system. The memory access requests have multiple levels associated with them including a privileged level and a user level. Privileged level requests are typically associated with tasks of high importance, such as operating system tasks or tasks which require priority in their execution. User level requests are more typically associated with application level tasks which do not require the same degree of priority.

As illustrated, the memory access requests are applied to the programmable memory protection unit and its map of the memory space. Within this map are a plurality of memory regions 2, 4, 6, 8 each with associated programmable memory attributes. Programmable memory region 4 is overlaid on top of programmable memory region 2 and is contained within it. Programmable memory region 4 has a higher position within the hierarchy of programmable memory regions and accordingly if a hit for a target address occurs within a programmable memory region 4, then the attributes for programmable memory region 4 are returned rather than the attributes for the underlying programmable memory region 2. Both privileged level requests and user level requests if they hit within the programmable memory protection unit results in programmable memory attributes being returned.

The memory map for the default memory protection unit is also illustrated and comprises contiguous non-overlapping default memory regions a, b, c, d, e. Each of these default hard-wired memory regions has associated default memory attributes. For those memory access requests which do not hit within the programmable memory protection unit, if the memory requests are privileged memory requests, then these will hit within the default memory protection unit and will result in default memory attributes being returned. User level memory access requests which do not hit within the programmable memory protection unit will not be serviced by the default memory protection unit (which is dedicated to privileged level requests) and will accordingly result in generation of a memory protection violation signal.

Figure 2:
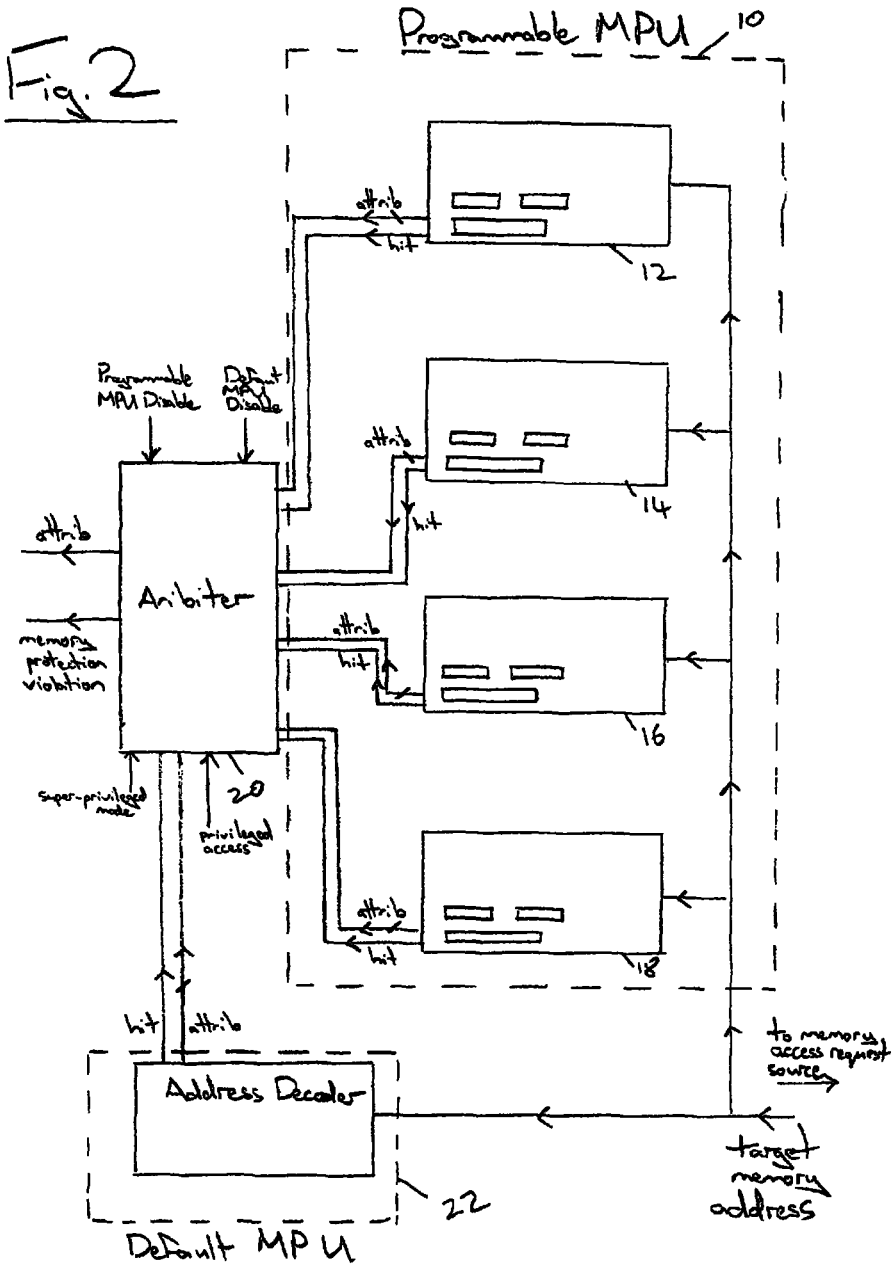
FIG. 2 schematically illustrates hardware serving as a programmable memory protection unit and a default memory protection unit.

FIG. 2 schematically illustrates hardware for implementing the memory protection operations shown in FIG. 1. The programmable memory protection unit 10 comprises four separate programmable units 12, 14, 16, 18 which respectively store data within programmable registers therein defining the position and size of the programmable memory regions associated with respective units as well as the programmable memory attributes associated with respective units. When a target memory address is input to the programmable memory protection unit 10, it is applied in parallel to each of the programmable units 12, 14, 16, 18 and a determination is made as to whether or not the target memory address lies within the programmable region memory associated with each of those programmable units 12, 14, 16, 18. If a hit is registered, then a hit signal for that programmable unit 12, 14, 16, 18 is generated and sent to an arbiter 20 as well as the programmable memory attributes for that programmable unit 12, 14, 16, 18. It will be appreciated that since overlapping programmable memory regions are permitted multiple hits may occur. Each of the programmable units 12, 14, 16, 18 has an associated position within a hierarchy. The hit occurring for the programmable unit 12, 14, 16, 18 having the highest position within the hierarchy will be the one selected by the arbiter 20 as being returned and will output to control that memory access.

In parallel with the operation of programmable memory protection unit 10, a default memory protection unit 22 operates to receive the target memory address and subject this to a decoding operation from which it is determined in which of the default memory regions a, b, c, d, e the target memory address lies. A hit signal and the default memory attributes associated with the determined default memory region are returned to the arbiter 20. In the example of FIG. 1, the default memory regions are shown as contiguous and spanning the whole of the memory address space, but it will be appreciated that in alternative embodiments the default memory regions may be discrete regions which do not completely span memory address space. Default memory regions may also be overlaid on top of other default memory regions in a manner similar to as has been previously described in association with the programmable memory protection unit. A privileged access signal is also input to the arbiter 20 to indicate whether the current memory access request associated with the target memory address is a privileged level memory access request. The arbiter 20 is also responsive to a signal indicating that the system is currently operating in a super-privileged mode, such as following a non-maskable interrupt, to disable the programmable memory protection unit 10 so that the default memory map will be used.

If a hit occurs within the programmable memory protection unit 10, then the programmable memory attributes returned from the appropriate programmable unit 12, 14, 16, 18 are output from the arbiter 20. If no hit occurs within the programmable memory protection unit 10, then if a hit occurs within the default memory protection unit 22 and the memory access request is a privileged memory access request, then the default memory attributes returned by the default memory protection unit 22 will be output from the arbiter 20.

As suggested schematically in FIG. 2, the default memory protection unit 22 since it is non-programmable, can generally be embodied with fewer gates and consume relatively little circuit resource whilst providing a background level of well defined and deterministic behaviour for at least privileged level memory access requests.

The arbiter 20 also has input signals which selectively disable the default memory protection unit 22 and the programmable memory protection unit 10. The default memory protection unit 22 may be disabled when the default memory regions and default memory attributes it provides are simply inappropriate to the desired operations. The programmable memory protection unit 10 may be disabled, for example, when it has become corrupted and it is desired to perform some repair operations without the corrupted contents of the programmable memory protection unit 10 interfering with that repair operation.

Figure 3:
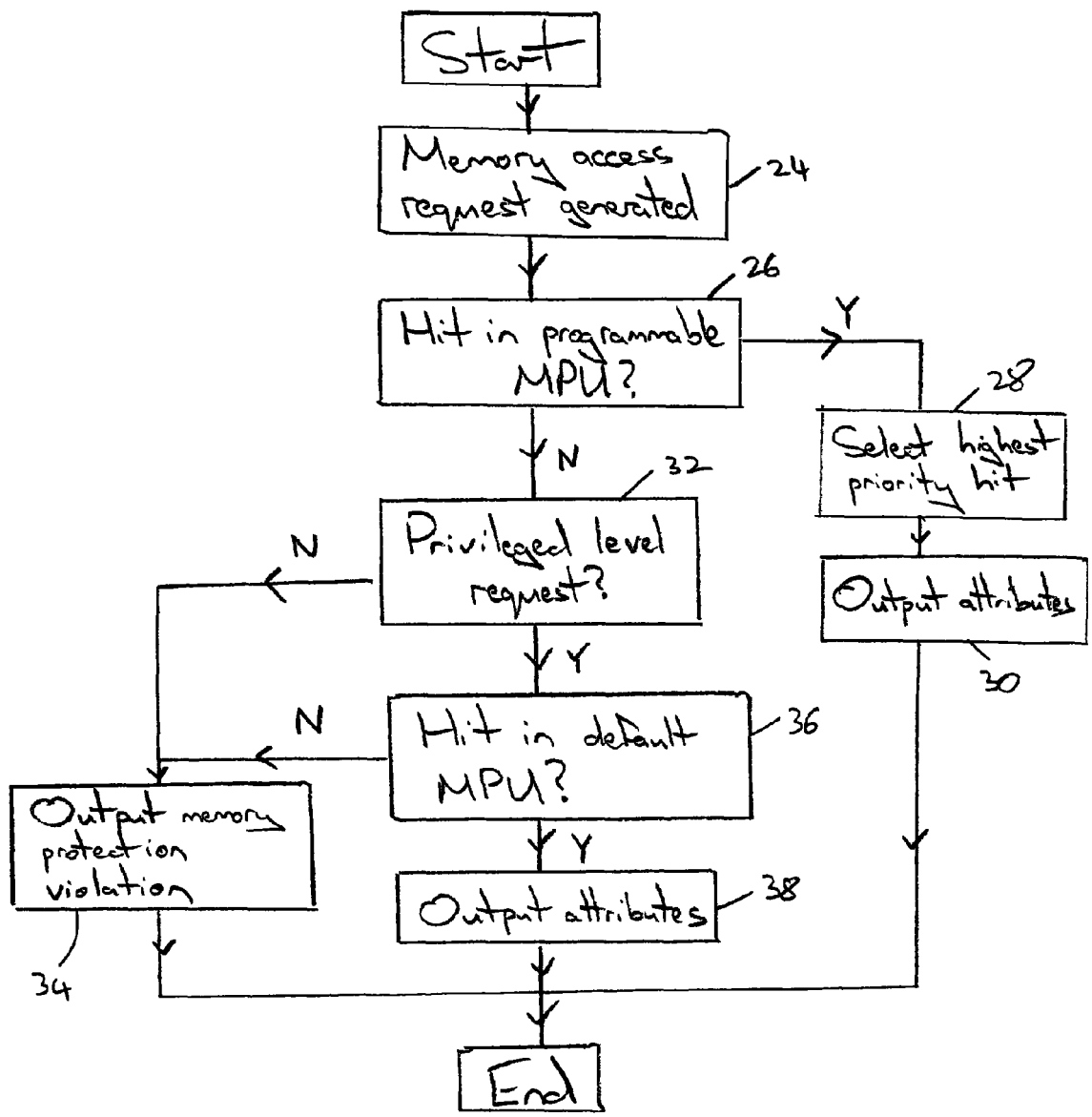
FIG. 3 is a flow diagram schematically illustrating the operation of the system of FIG. 2.

FIG. 3 is a flow diagram schematically illustrating the operation of the system of FIG. 2. At step 24, a memory access request is generated. At step 26, a determination is made as to whether a hit is generated within the programmable memory protection unit 10. If a hit is generated, then at step 28 the arbiter 20 selects the highest priority hit should more than one hit have been generated. At step 30, the arbiter then outputs the selected programmable memory attributes.

If the determination at step 26 was that there was no hit within the programmable memory protection unit 10, then step 32 determines whether or not the memory access request is a privileged level memory access request. If the memory access request is not privileged level, then the default memory protection unit 22 will not be used to generate default memory attributes for that memory access request and instead a memory protection violation signal will be generated at step 34. If the memory access request is of a privileged level, then a determination is made at step 36 whether or not this generates a hit within the default memory protection unit 22. If the default memory protection unit 22 is configured as shown in FIG. 1, such that the default memory regions are contiguous and span the complete memory address space, then a hit will always occur within the default memory protection unit. However, if the default memory protection unit is configured to not have contiguous default memory regions, then a hit cannot be guaranteed and if a hit does not occur then again processing will proceed to step 34 where a memory protection violation signal will be generated.

If a hit does occur within the default memory protection unit 22, as detected at step 36, then step 38 serves to output the default memory attributes.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for processing data, said apparatus comprising:
   a source of memory access requests to respective memory addresses within a memory address space;
   a programmable memory protection unit configured to store programmable data defining a plurality of programmable memory regions within said memory address space having associated programmable memory attributes, said programmable memory protection unit being operable to receive a memory access request to a target memory address from said source and, if said target address lies within one or more of said plurality of programmable memory regions, then to return an associated programmable memory attribute for said target address; and
   a default memory protection unit hard-wired to define a plurality of default memory regions within said memory address space having associated default memory attributes, said default memory protection unit being operable to receive said memory request to said target memory address from said source and, if said target address does not lie within one or more of said plurality of programmable memory regions, then to return an associated default memory attribute for said target address, wherein said default memory protection unit is controllable to be enabled or disabled and if said default memory protection unit is disabled, then if said target address does not lie within one or more of said plurality of programmable memory regions, then a memory protection violation signal is generated.

2. Apparatus as claimed in claim 1, wherein said memory access requests include privileged level requests and non-privileged level requests, said default memory protection unit being operable if said target address does not lie within one or more of said plurality of programmable regions to:
   (i) if said memory access request is a privileged level request, then to return said associated default memory attribute for said target address; and
   (ii) if said memory access request is not a privileged level request, then not to return said associated default memory attribute for said target address.

3. Apparatus as claimed in claim 2, wherein if said memory access request is a non-privileged level request and said target address does not lie within one or more of said plurality of programmable regions, then a memory protection violation signal is generated.

4. Apparatus as claimed in claim 1, wherein said programmable memory protection unit and said default memory protection unit operate in parallel to receive said memory access request and to determine said programmable memory attribute and said default memory attribute respectively.

5. Apparatus as claimed in claim 1, wherein said default memory regions span said memory address space such that said target address lies within at least one default memory region.

6. Apparatus as claimed in claim 1, wherein said programmable memory regions have an associated hierarchy such than, when said target address lies within a plurality of overlapping programmable memory regions, programmable memory attributes are returned associated with that programmable memory region of said plurality of overlapping programmable memory regions having a highest position within said hierarchy.

7. A method of processing data, said method comprising the steps of:
- generating memory access requests to respective memory addresses within a memory address space;
- storing programmble data within a programmable memory protection unit defining a plurality of programmable memory regions within said memory address space having associated programmable memory attributes;
- receiving a memory access request to a target memory address in said programmable memory protection unit and, if said target address lies within one or more of said plurality of programmable memory regions, then returning an associated programmable memory attribute for said target address;
- storing default data within a default memory protection unit hard-wired to define a plurality of default memory regions within said memory address space having associated default memory attributes; and
- receiving a memory request to a target memory address in said default memory protection unit and, if said target address does not lie within one or more of said plurality of programmable memory regions, then returning an associated default memory attribute for said target address, wherein said default memory protection unit is controllable to be enabled or disabled and if said default memory protection unit is disabled, then if said target address does not lie within one or more of said plurality of programmable memory regions, then a memory protection violation signal is generated.

8. Apparatus as claimed in claim 1, wherein said programmable memory protection unit is controllable to be enabled or disabled and if said programmable memory protection unit is disabled, then if said target address lies within one or more of said plurality of programmable memory regions, then said default memory attributes from said default memory protection unit are returned.

9. Apparatus as claimed in claim 1, wherein said apparatus is operable in at least one privileged mode in which said programmable protection unit is disabled.

10. A method as claimed in claim 7, wherein said memory access requests include privileged level requests and non-privileged level requests, said default memory protection unit being operable if said target address does not lie within one or more of said plurality of programmable regions to:
  (i) if said memory access request is a privileged level request, then to return said associated default memory attribute for said target address; and
  (ii) if said memory access request is not a privileged level request, then not to return said associated default memory attribute for said target address.

11. A method as claimed in claim 10, wherein if said memory access request is a non-privileged level request and said target address does not lie within one or more of said plurality of programmable regions, then a memory protection violation signal is generated.

12. A method as claimed in claim 7, wherein said programmable memory protection unit and said default memory protection unit operate in parallel to receive said memory access request and to determine said programmable memory attribute and said default memory attribute respectively.

13. A method as claimed in claim 7, wherein said default memory regions span said memory address space such that said target address lies within at least one default memory region.

14. A method as claimed in claim 7, wherein said programmable memory regions have an associated hierarchy such than, when said target address lies within a plurality of overlapping programmable memory regions, programmable memory attributes are returned associated with that programmable memory region of said plurality of overlapping programmable memory regions having a highest position within said hierarchy.

15. A method as claimed in claim 7, wherein said programmable memory protection unit is controllable to be enabled or disabled and if said programmable memory protection unit is disabled, then if said target address lies within one or more of said plurality of programmable memory regions, then said default memory attributes from said default memory protection unit are returned.

16. A method as claimed in claim 7, wherein when operating in at least one privileged mode said programmable memory protection unit is disabled.

* * * * *